United States Patent [19]

Miyazaki

[11] Patent Number: 5,446,646

[45] Date of Patent: Aug. 29, 1995

[54] METHOD AND APPARATUS FOR CONTROL OF PULSE WIDTH MODULATION (PWM) CONVERTER

[75] Inventor: Masanori Miyazaki, Tokorozawa, Japan

[73] Assignee: Kabushiki Kaisha Toshiba, Kawasaki, Japan

[21] Appl. No.: 851,782

[22] Filed: Mar. 16, 1992

[30] Foreign Application Priority Data

Mar. 15, 1991 [JP] Japan .................................. 3-050900

[51] Int. Cl.[6] ............................................ H02M 7/219
[52] U.S. Cl. ........................................ 363/89; 363/41; 363/79; 323/207
[58] Field of Search ................. 363/89, 37, 79, 80, 363/41, 87, 127, 129; 323/207

[56] References Cited

U.S. PATENT DOCUMENTS

| | | | |
|---|---|---|---|
| 4,247,888 | 1/1981 | Angquist | 363/47 |
| 4,264,951 | 4/1981 | Konishi et al. | 365/35 |
| 4,767,976 | 8/1988 | Mutoh et al. | 318/808 |
| 5,041,959 | 8/1991 | Walker | 363/79 |
| 5,047,909 | 9/1991 | Hosoda | 363/40 |
| 5,177,677 | 1/1993 | Nakata et al. | 363/89 |

OTHER PUBLICATIONS

Patent Abstracts No. 1-157277, A. Kimura, Jun. 20, 1989, "Controlling Device For PWM Converter".

*Primary Examiner*—Peter S. Wong
*Assistant Examiner*—Adolf Berhane
*Attorney, Agent, or Firm*—Foley & Lardner

[57] ABSTRACT

A control method for a PWM converter which is connected to an AC current source via a reactor, and performs the sending and receiving of power between the AC power source and a DC power source, includes a step of separating a supplied AC current into an effective current and a reactive current and performing PWM control and a step for control so that said reactive current is larger when there is conversion of DC power into AC power, than when there is conversion of an AC power into DC power. In addition, the control apparatus includes a detector element which detects at least two phases of a three-phase AC current as a current detection value, a phase detection element which detects a voltage phase of the three-phase current, a current separation element which uses the voltage phase to separate the detected current detection value into an effective current and a reactive current, an effective current control element which performs feedback control so that the separated effective current becomes a required value, a reactive current control element which performs feedback control so that the separated reactive current becomes a required value, and a reference calculation element which calculates a reference value so that an reference value of a reactive current becomes larger for when the effective current and power voltage are of opposite polarities, than for when they are of the same polarity.

3 Claims, 5 Drawing Sheets

METHOD AND APPARATUS FOR CONTROL OF PULSE WIDTH MODULATION (PWM) CONVERTER

BACKGROUND OF THE INVENTION

The present invention relates to a power converter using pulse width modulation (PWM) control and more particularly, relates to a method and apparatus for control of a PWM converter, which enables the performance of power regeneration operation from a direct current (DC) side to an alternating current (AC) side. One type of power converter is a PWM converter that is configured from switching devices of the self turn-off type such as gate turn-off (GTO) thyristors, giant transistors (GTR)—one kind of bipolar transistors—and the like, and these are widely used as direct current power sources for voltage-type inverters when AC motors are to be driven at variable speed.

FIG. 1 shows the general configuration of the main circuit of this type of PWM converter, and FIG. 2 shows the overall circuit configuration that includes a conventional control circuit. In FIG. 1, a PWM converter 1 comprises a bridge circuit in which a diode 1B is connected in reverse parallel with a switch circuit 1A of a self turn-off type. The converter 1 is connected to an AC power source 3 through an AC reacter, and is connected to a filter capacitor 4 at a DC power side. In FIG. 2, a load 5 is a load of the PWM converter and so, for example, can be thought of as being an inverter like the power reconverter. In the normal form of use, motors of air-conditioners and washing machines are further provided as further loads of the load 5. A voltage detection circuit 6 detects the DC voltage of the PWM converter 1. A voltage control circuit 7 compares the voltage reference V* and the DC voltage V, and outputs a current amplitude reference I* so that the difference between the two is reduced. A phase detection circuit 8 outputs sync signals (phase signals) $\theta_{PS}$ in sync with the voltage of the AC power. A current reference circuit 9 outputs the three phase sine-wave AC current reference $I_R^*$, $I_S^*$ and $I_T^*$ that relate to the amplitude of the reference I* in sync with the AC power in response to the sync signals (phase signals) $\theta_{PS}$ and the current amplitude reference I*. A current control circuit 10R compares an R-phase feedback current $I_R$ detected by the current detector 12R with an R-phase current reference $I_R^*$, and outputs an R-phase voltage reference $e_R^*$ so that the two become equal. Current control circuits 10S and 10T for an S-phase and a T-phase are similar. In sync with the phase signal $\theta_{PS}$ a sawtooth wave generation circuit 13 outputs sawtooth wave carrier signals $TR_{PS}$ that have a frequency which is an integral number of times of the power frequency. A PWM control circuit 11 compares the sawtooth wave carrier signals $TR_{PS}$ with each of phase voltage reference $e_R^*$ and $e_S^*$ and $e_T^*$ and outputs a switching reference SW of the self turn-off type device of the PWM converter 1.

In a PWM converter having the configuration described above, there is reversibility between the DC power and the AC power. When there is a power running operation where the load 5 consumes the DC power, the DC voltage V drops and a positive voltage difference occurs, and the voltage control circuit 7 outputs the current amplitude reference I* at a positive polarity so as to raise the DC voltage. Accordingly, the currents $I_R$, $I_S$ and $I_T$ of each of the phases flow at the same phase as the AC power voltage $V_{AC}$ and power is supplied to the load side. On the other hand, when a regeneration operation, where the load 5 regenerates the DC power, is performed, the DC voltage V rises and a negative voltage difference occurs, and the voltage control circuit 7 outputs a current amplitude reference I* at a negative polarity so that the DC voltage drops. Accordingly, the reference values $I_R^*$, $I_S^*$ and $I_T^*$ of each of the phases become the opposite phase to the AC power voltage $V_{AC}$ and the actual $I_R$, $I_S$ and $I_T$ of each of the phases also flow in the opposite phase, and DC power is regenerated to the AC circuit from the PWM converter 1.

FIG. 3A and FIG. 3B are the vector diagrams the power-running and regenerating operation, respectively. In the figures, $V_{AC}$ is an AC power voltage, $I_P$ is an AC current vector, $V_L$ is a reactance voltage vector of an AC reactor 2, and $V_{IN}$ is an input voltage vector of a PWM converter. As shown in FIG. 3A, when there is power-running, the AC power voltage $V_{AC}$ and $I_P$ are controlled to the same phase, and as shown in FIG. 3B, they are controlled to opposite phases when there is regeneration.

In a PWM converter having the configuration described above, it is necessary to increase the DC voltage of the PWM converter, in comparison with the AC power voltages and this increases the cost since it is necessary to use as a switching element a semiconductor element and a high-voltage proof element in order to proof a high-voltage. In particular, when there is a regeneration function, supplying power from the side of the load is a large problem since the $I_R$ drop and the reactance drop inside the apparatus require that the DC voltage be even higher than when there is power-running.

SUMMARY OF THE INVENTION

An object of the present invention is to provide a PWM converter control method and apparatus that enables the performance of power regeneration operation from a direct current side and at a lower DC voltage than conventionally used.

In order to attain this objective, a method of the present invention for controlling a PWM converter which is connected to a DC power source via a reactor, and performs the sending and receiving of power between an AC power source and a DC power source, comprises a step of separating a supplied AC current into an effective current and a reactive current so as to perform PWM control, and a step of controlling the advancing reactive current when there is conversion of DC power into AC power than when there is conversion of AC power into DC power. By the adoption of such a configuration, the phase of the reactor voltage vector changes and as a result, it is possible to perform a regeneration operation at a low DC voltage.

In addition, a control apparatus of the present invention for controlling PWM converter which is connected to a reactor via an AC power source, and performs the sending and receiving of power between an AC power source and a DC power source, compares a means for detecting at least two phases of a three-phase AC current as a current detection value, a means for detecting a voltage phase of said three-phase current, a means for separating the detected current detection value into an effective current and a reactive current by using the voltage phase, an effective current control means for performing feedback control so that the separated effective current becomes a required value, a reactive current control means for performing feedback control so that the separated reactive current becomes a required value, and a reactive current reference calculation means for calculating a reference value so that a reference value of a reactive current becomes larger for when the effective current and power voltage are of opposite polarities, than for when they are of the same polarity. In a control apparatus relating to the present invention, the reactive current reference calculation means determines the reactive current in accordance with the effective current and the effective current reference, and generates a reactive current reference when the effective current or the effective current reference are negative, and performs regeneration operation at a low current voltage.

According to the present invention, it is possible to reduce the DC voltage when there is power regeneration operation to convert the DC power into AC power and so it is possible to lower the voltage rating of the main circuit, and therefore provide a PWM converter control method and control apparatus that has an improved economy.

DETAILED DESCRIPTION OF THE PREFERRED EMBODIMENTS

Figure 4:
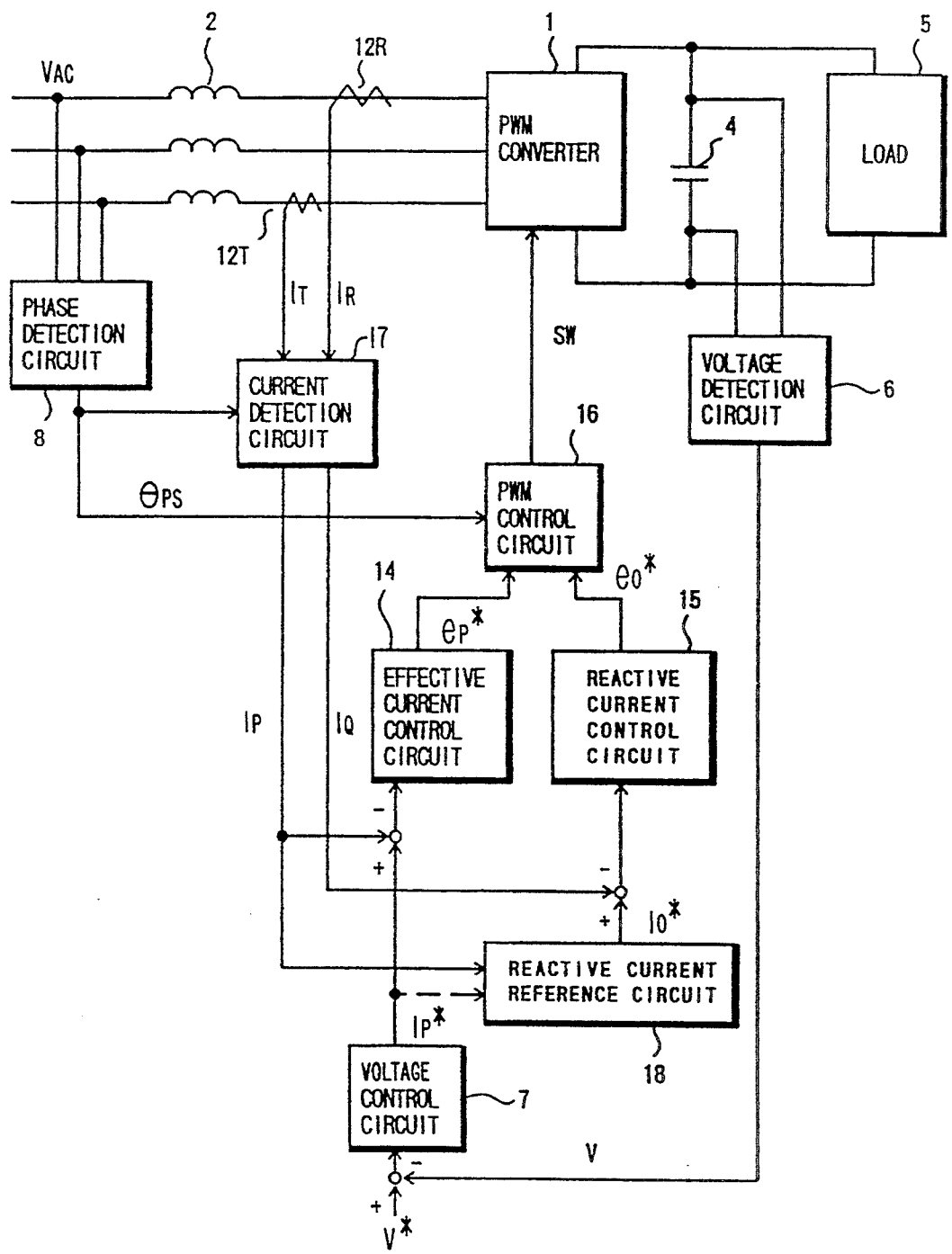
FIG. 4 is a block diagram showing an outline configuration of a pulse width modulation conversion method and apparatus relating to one embodiment of the present invention.
Figure 5:
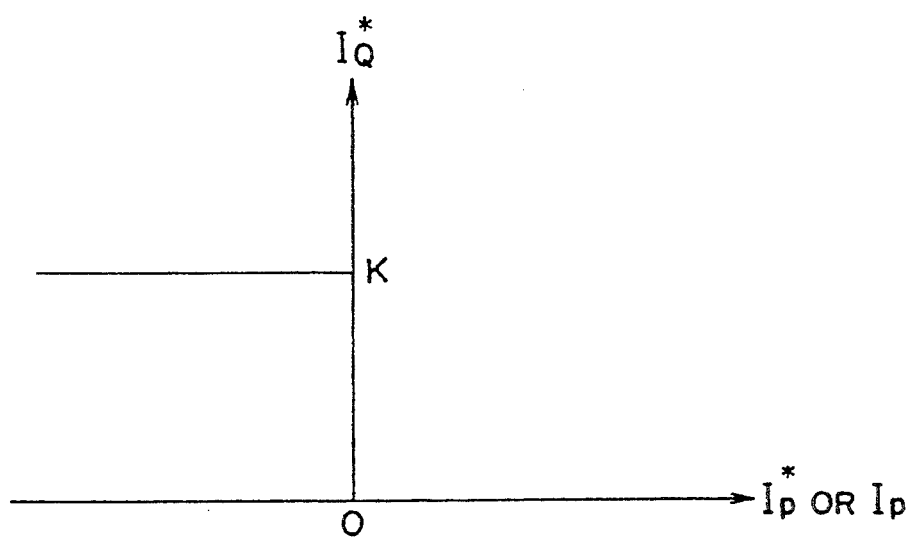
FIG. 5 is a characteristics diagram showing the characteristics of a reactive current reference circuit in the pulse width modulation conversion method and apparatus shown in FIG. 4.
Figure 6:
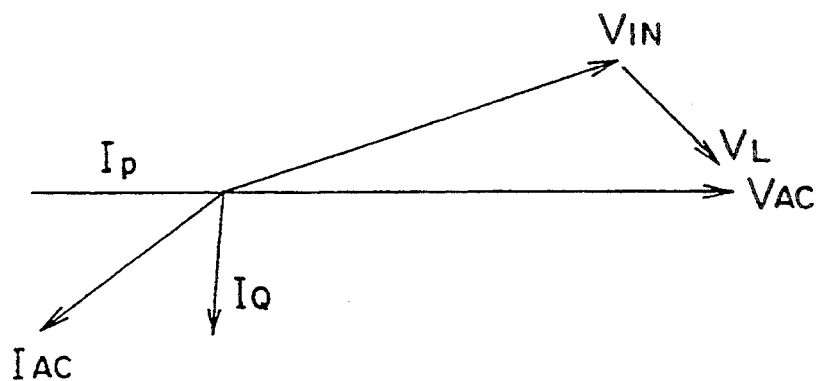
FIG. 6 is a vector diagram that indicates the voltage vector when there is regeneration of a PWM converter controlled by the pulse width modulation conversion method and apparatus shown in FIG. 4.

The following is a detailed description of preferred embodiments of the pulse width modulation (PWM) conversion method and apparatus relating to the present invention, with reference to the appended drawings. FIGS. 4, 5 and 6 are for describing a first embodiment of the present invention.

Figure 1:
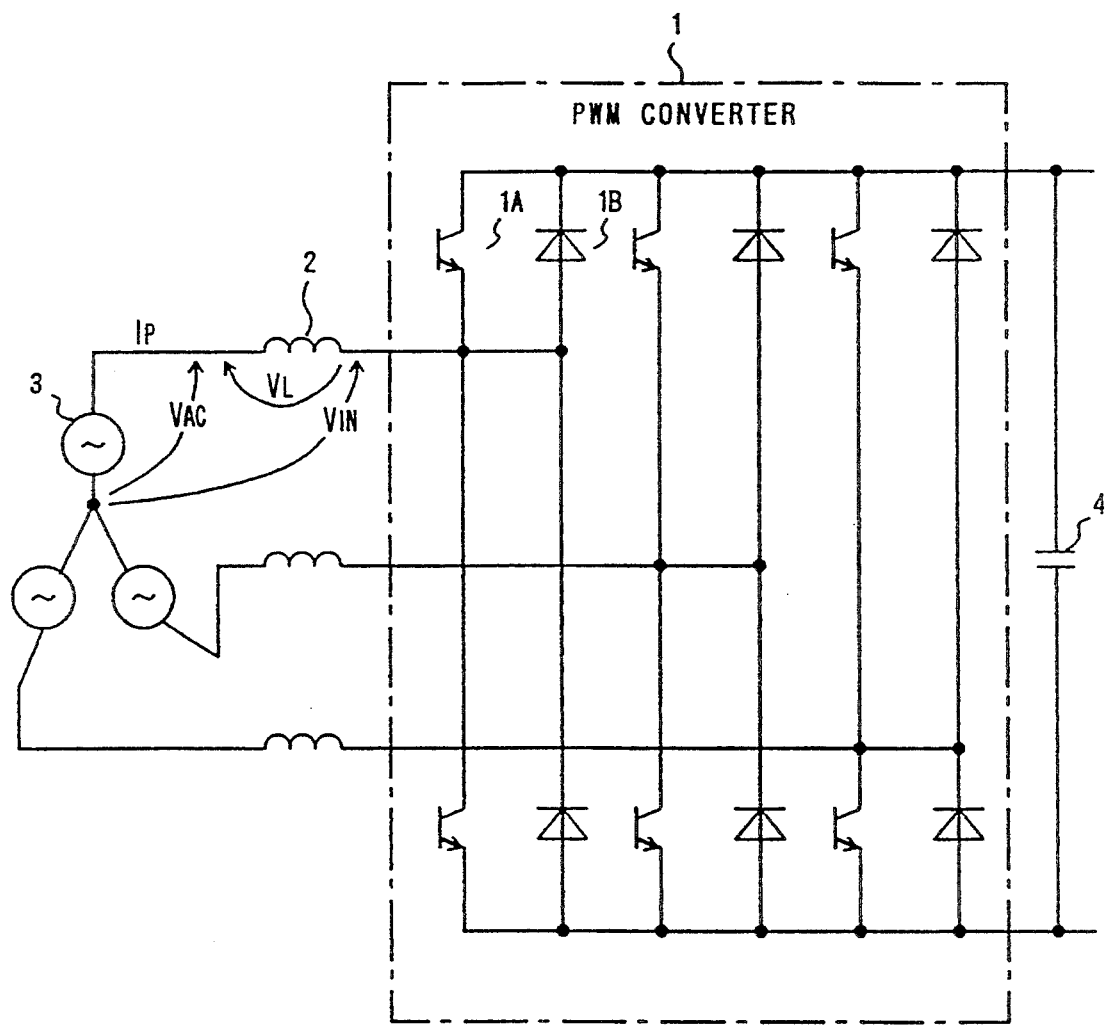
FIG. 1 is a circuit diagram showing a main circuit of a general PWM converter.
Figure 2:
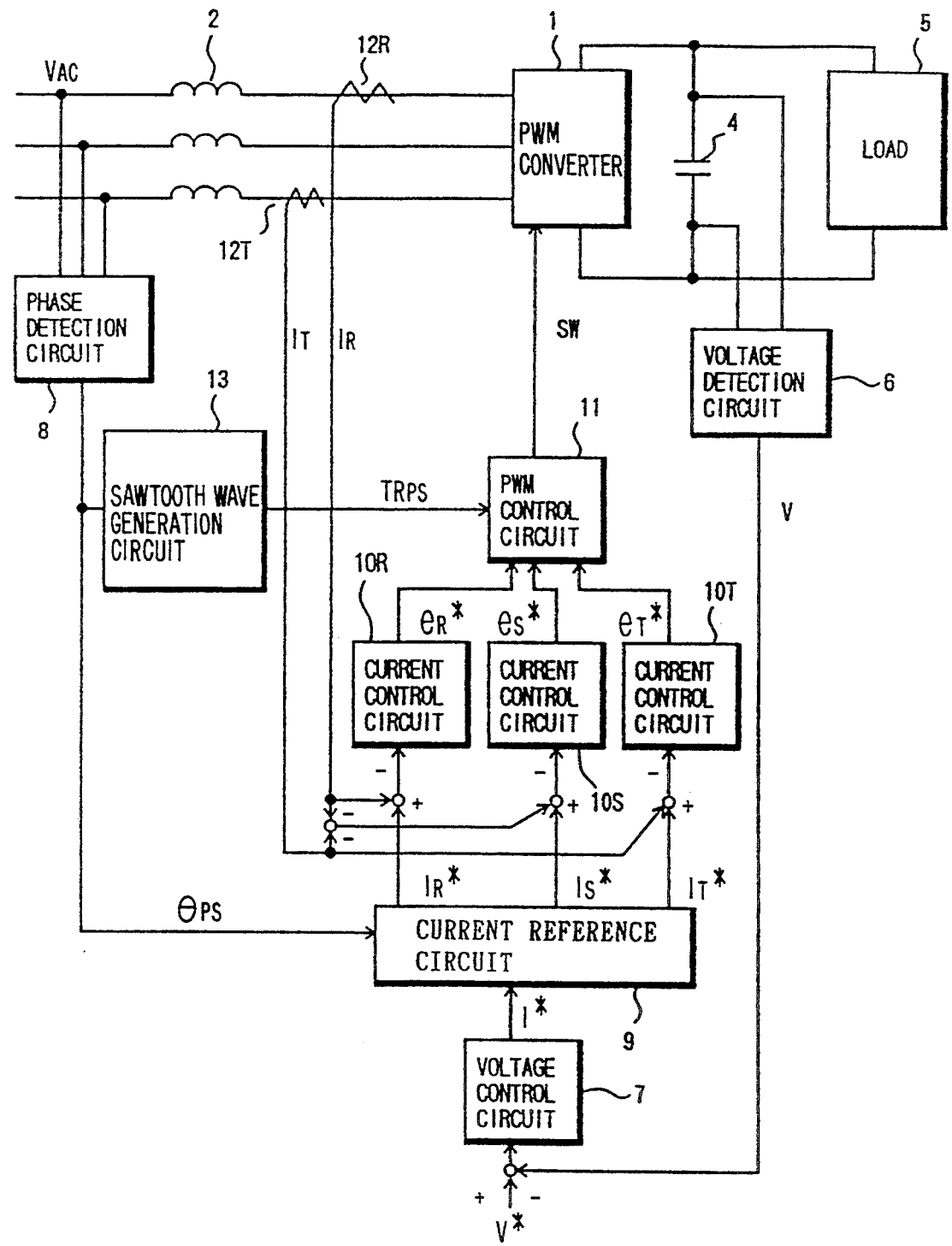
FIG. 2 is a block diagram that shows the outline of a control apparatus of a conventional PWM converter.
Figure 3A:
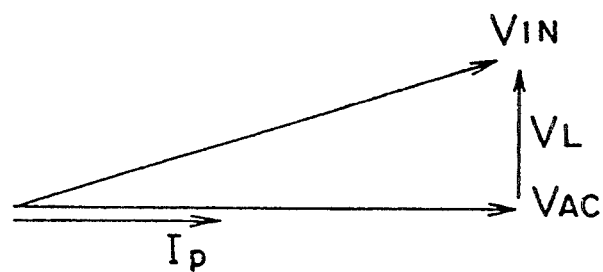
FIGS. 3A and 3B are vector diagrams showing when there is powering and regeneration operation, respectively.
Figure 3B:
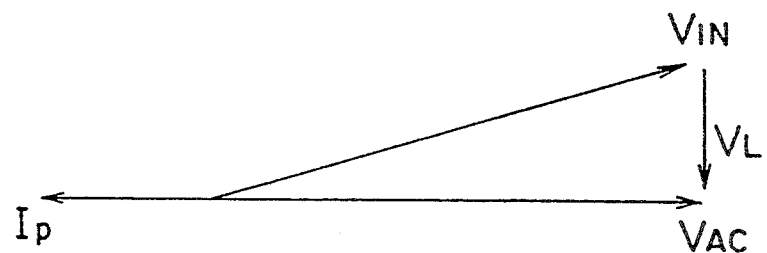

In FIG. 4, those portions that correspond to portions of FIG. 2 are indicated with corresponding numerals, and the corresponding descriptions of them are omitted. In this embodiment, the newly provided elements are an effective current control circuit 14, a reactive current control circuit 15, a PWM control circuit 16, a current detection circuit 17 and a reactive current reference circuit 18. In this embodiment, the voltage control circuit 7 compares the voltage reference V* with the voltage V which is detected by the voltage detection circuit 6 and calculates the effective current reference $I_P^*$. The current detection circuit 17 uses the AC currents $I_R$ and $I_T$ which are respectively detected by the current detectors 12R and 12T and the phase signals $\theta_{PS}$ of the AC power voltage $V_{AC}$ which is detected by the phase detection circuit 8, calculates the effective portion $I_P$ and the reactive portion $I_Q$, and separates them to output. The effective current control circuit 14 compares the effective current reference $I_P^*$ with the effective portion $I_P$ and calculates the effective voltage reference $e_P^*$ of the PWM converter 1. On the other hand, the reactive current control circuit 15 compares the reactive portion $I_Q$ with the reactive current reference $I_Q^*$ and calculates the reactive voltage reference $e_Q^*$ of the PWM converter 1. The PWM control circuit 16 outputs a switching signal SW to the PWM converter 1 of the self turn-off type of switching element, by means of the PWM control for the effective voltage reference $e_P^*$ and the reactive voltage reference $e_Q^*$ on the basis of the phase signal $\theta_{PS}$ of the AC power and which is formed by the vector composition from each phase of three components. In a PWM converter having such a configuration, the reactive current reference $I_Q^*$ is controlled by the reactive current reference circuit 18 in the manner shown in FIG. 5. More specifically, when the effective current $I_P$ or that reference value $I_P^*$ is of positive polarity, that is, when the PWM converter 1 performs power-running operation with the AC power being successively converted into DC power, the reactive current reference $I_Q^*$ is controlled to "0". In addition, when the effective current $I_P$ or that reference value $I_P^*$ is of negative polarity, that is, when the PWM converter 1 performs regeneration operation with the DC power being successively reconverted into AC power, the reactive current reference $I_Q^*$ is controlled to "K".

In a PWM converter having a configuration as described above, when compared to a conventional configuration, it is possible to reduce the input voltage $V_{IN}$ of the PWM converter 1 and the DC voltage V when there is regeneration. This is described with reference to FIG. 6. More specifically, when there is regeneration, the flowing of the reactive current $I_Q$ at the same time as when the effective current $I_P$ flows in opposite phase to the AC voltage $V_{AC}$, changes the power ratio in the direction of advance of the AC power voltage $V_{AC}$ and changes the phase of a voltage vector $V_L$ of an AC reactor. As a result, it is possible for the input voltage $V_{IN}$ of the PWM converter to be made smaller than conventionally possible. This is to say that advancing the phase of the AC current enables regeneration at a low DC voltage, and thereby enables the provision of a PWM converter that enables stable regeneration without a large increase in cost. Namely, it is unnecessary for the PWM converter controller of this invention to use the high-voltage-proof circuit element higher than one required for ordinary use.

Figure 7:
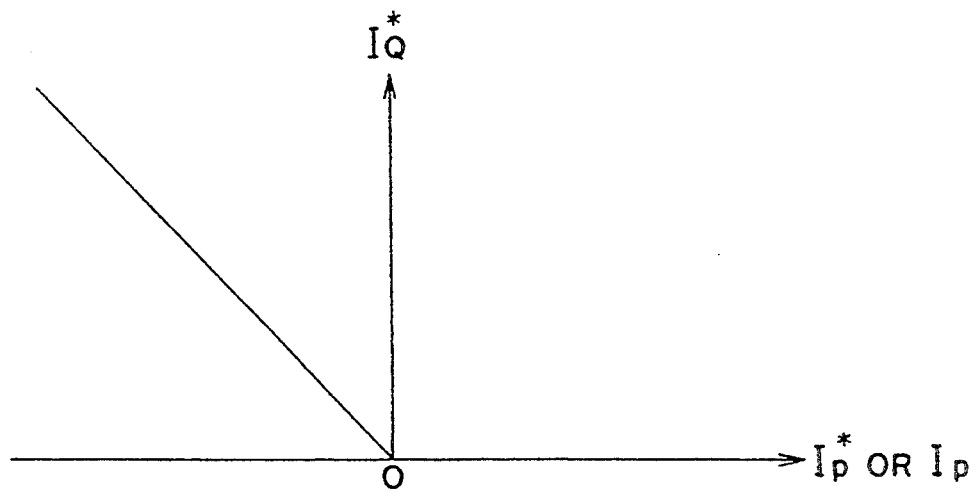
FIG. 7 is a characteristics diagram showing the characteristics of a reactive current reference circuit in the pulse width modulation conversion method and apparatus relating to another embodiment of the present invention.

FIG. 7 shows a second embodiment of the pulse width modulation conversion method and apparatus relating to the present invention. The basic configuration of this embodiment is substantially the same as that of the afore-mentioned first embodiment, and so duplicate description will be omitted. In this second embodiment, the reactive current reference circuit 18 makes the reactive current reference "0" when the effective current $I_P$ or the effective current reference $I_P^*$ is of positive polarity (power-running), and when they are negative polarity, outputs the reactive current reference $I_Q^*$ in comparison with the effective current $I_P$ or the effective current reference $I_P^*$. In this case, the AC current $I_{AC}$ becomes a constant power ratio irrespective of the size of the effective current $I_P$ when there is regeneration, and therefore it is possible to provide a PWM converter that enables regeneration operation at a low DC voltage in the same manner as in the first embodiment.

What is claimed is:

1. In a control apparatus for a pulse width control (PWM) converter which is connected to a reactor via an alternating current (AC) power source, and which performs the sending and receiving of power between the AC power source and a direct current (DC) power source, said PWM converter receiving either AC power or DC power, said control apparatus comprising:
   means for detecting current detection values of at least two phases of a three-phase AC power;
   means for detecting a voltage phase of said three-phase AC power;
   means for separating said current detection values into an effective current and a reactive current by using said voltage phase of said three-phase AC power;
   effective current control means for performing feedback control so that said separated effective current becomes equal to a first required value;
   reactive current control means for performing feedback control so that said separated reactive current becomes equal to a second required value; and
   reference calculation means for calculating a reactive current reference so that a reference value of said reactive current becomes larger when said effective current and power voltage are of opposite polarities than when they are of the same polarity.

2. The PWM converter control apparatus of claim 1, wherein:
   said reference calculation means is configured so that said reactive current is controlled to "0" when there is conversion of the AC power into the DC power, and said reactive current is controlled to a value greater than "0" when there is conversion of the DC power into the AC power.

3. The PWM converter control apparatus of claim 2, wherein:
   said reference calculation means is configured so that said reactive current is controlled to "0" when there is conversion of the AC power into the DC power, and said reactive current is controlled to be proportional to said effective current when there is conversion of the DC power into the AC power.

* * * * *